United States Patent [19]

Harbour et al.

[11] 4,272,596
[45] Jun. 9, 1981

[54] ELECTROPHORETIC DISPLAY DEVICE

[75] Inventors: John R. Harbour, Mississauga; Michael L. Hair, Oakville, both of Canada

[73] Assignee: Xerox Corporation, Stamford, Conn.

[21] Appl. No.: 44,802

[22] Filed: Jun. 1, 1979

[51] Int. Cl.³ .................. C25D 1/12; G03G 13/00
[52] U.S. Cl. ............................................ 430/37; 430/38
[58] Field of Search .................... 427/14; 204/181 R; 430/37, 38

[56] References Cited

U.S. PATENT DOCUMENTS

| Re. 28,360 | 3/1975 | Evans et al. | 358/56 |
|---|---|---|---|
| 1,963,496 | 6/1934 | Land | 88/61 |
| 3,666,472 | 5/1972 | Till et al. | 96/88 |
| 3,668,106 | 6/1972 | Ota | 204/180 R |
| 3,708,219 | 1/1973 | Forlini et al. | 350/150 |
| 3,850,506 | 11/1974 | Johnson et al. | 350/160 P |
| 3,876,288 | 4/1975 | Iwata | 350/160 |
| 4,126,528 | 11/1978 | Chiang | 204/181 |

Primary Examiner—Bernard D. Pianalto

[57] ABSTRACT

An electrophoretic display device which provides high contrast images and a stable suspending fluid is described. A white marking material such as titanium dioxide is suspended in a colloidal dispersion containing black colorant such as colloidal size iron oxide particles known as ferrofluids. Image formation is achieved electrophoretically by selective application of an electric field across the imaging suspension.

9 Claims, 1 Drawing Figure

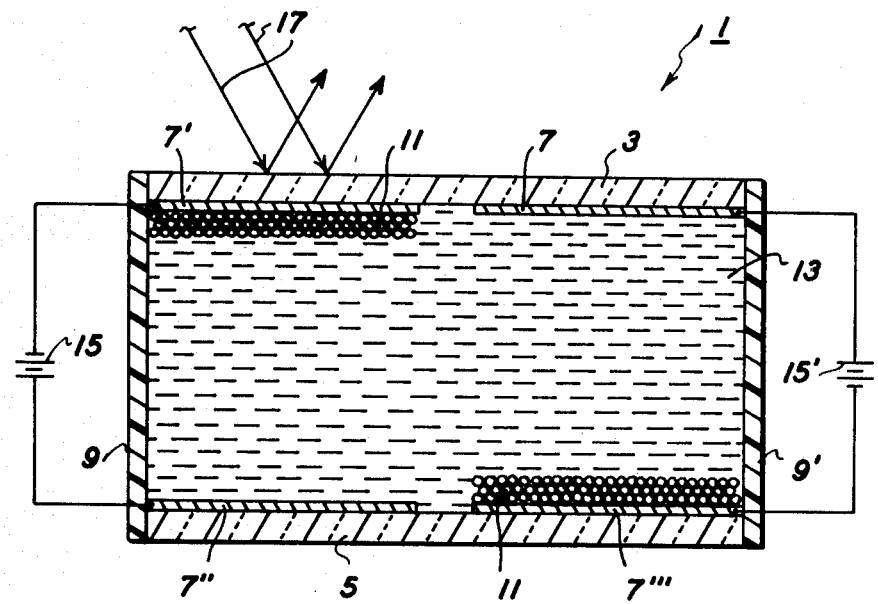

ELECTROPHORETIC DISPLAY DEVICE

This invention relates to an electrophoretic method and device and more particularly to display elements which provide high contrast black/white image creation.

There has long been known in the art a stable suspension of colloidal iron oxide particles in an organic liquid such as mineral oil. The suspension is generally known in the art as a "ferrofluid" and has found utility in processes and devices involving magnetic field effects. A typical application of devices utilizing a suspension of magnetic particles is in light controlling devices termed in the art "light valves". Such devices are described in U.S. Pat. Nos. 3,708,219 to Forlini et al.; 3,850,506 to Johnson et al.; and 3,876,288 to Iwata et al. In these devices, a magnetic field is employed to locate the magnetic particles in such manner that the amount of light passing through the device is controlled since the magnetic particles have panchromatic absorption in the visible spectrum.

In U.S. Pat. No. 1,963,496, a suspension of magnetic particles is utilized together with non-magnetic particles in another form of a light valve. In this device, the shape, as well as the magnetic property of the suspended particles, is also employed to achieve control of the amount of light passing through the device.

In a different application, magnetic particles, in relatively small amounts, have been utilized in a photoelectrophoretic imaging system to achieve agitation of the imaging suspension during the imaging process. Such a process is described in U.S. Pat. No. 3,666,472 to Watson et al. wherein about one percent by weight of finely divided magnetic particles are incorporated into the imaging suspension together with the electrically photosensitive particles. The separation of the individual particles in accordance with their color is found to be aided by oscillating a magnetic field across the imaging suspension during the imaging step thereby breaking up the colored particles by collision with the suspended magnetic particles.

In Re 28,360 to Evans et al., there is disclosed an electrophoretic display device utilizing the electrically photosensitive particles of U.S. Pat. No. 3,666,472 to achieve two-color imaged display. However, no magnetic components are included in the device.

The advantages of electrophoretic display as a means for providing information has been well appreciated in the prior art. Such display devices are particularly useful in conjunction with electronic data. However, materials useful in the electrophoretic display devices of the prior art did not usually provide good contrast between the image and background areas. In most instances, the contrast was achieved by employing a molecularly soluble dye in the suspending medium which carried the electrophoretically active particles. Another means to enhance the contrast of the image was to add colored particles to the suspending medium, usually black in color. However, keeping these particles in suspension over long periods of time is very difficult and in most cases not completely achieved.

Accordingly, it is an object of the present invention to provide an electrophoretic imaging medium which provides a stable suspension of colored particles which provide a high contrast for the electrophoretically active particles. Another object of this invention is to provide electrophoretic display devices having short memory and are therefore capable of rapidly successive different images.

According to this invention, there is provided an electrophoretic display device comprising a pair of electrodes associated so as to form a cavity therebetween, which cavity is filled with an electrophoretic suspension layer comprising a colored suspending medium containing colloidal sized particles in an electrically insulating liquid and finely divided electrophoretic particles suspended in the suspending medium. A source of electrical potential is coupled to the electrodes and with an electric field applied, the marking particles form an image as they follow the field.

In accordance with this invention, the suspending medium is conventionally provided by the incorporation of colloidal size particles in an electrically insulating liquid. The presence of colloidal sized particles overcomes the problem of the prior art wherein the background colorant in the suspending medium separates from the liquid and settles to the bottom of the cavity. The colloidal sized particles stay in suspension indefinitely and provide a high quality contrast medium for the image-forming electrophoretic particles.

A source of such colloidal sized particles readily available is a product generally known as "ferrofluids". A ferrofluid is a suspension of iron oxide particles having a diameter in range of from about 50 Angstroms to about 250 Angstroms and normally about 100 Angstroms. Because iron oxide particles provide a dense black color, the ferrofluids provide a high contrast background in the preferred mode when white electrophoretic particles are employed.

By including colloidal sized iron oxide particles in the suspending medium many advantages are obtained not heretofore appreciated. First, as mentioned above, very high contrast with white imaging particles is achieved. The ferrofluid can be incorporated into the electrophoretic cell in the form in which it is commercially available or can be diluted with an appropriate amount of an electrically insulating liquid. Dilution of the ferrofluid achieves economy as well as controlling the conductivity of the suspending medium.

In the prior art, imaging particles have been known to plate out onto the viewing electrode and permanently remain there thus degrading subsequent images. In accordance with this invention, the incorporation of colloidal sized iron oxide particles into the suspending medium eliminates the problem of "plating out" of imaging particles on the electrodes. The colloidal sized iron oxide particles in the suspending medium are observed to be in motion when an electrical field is applied across the suspension. The motion of the iron oxide particle is believed to remove any imaging particles which have plated out onto the imaging electrode.

Further, another advantage obtained by the present invention is the establishment of a more uniform suspension of imaging particles. Although some settling of the imaging particles in the cell occurs when the cell is not in use, the imaging particles are quickly redispersed in the imaging suspension in accordance with the invention because of the churning motion of the iron oxide particles under an applied electrical field. Thus, immediately upon application of an electrical field, the imaging particles are dispersed in the imaging suspension thereby providing improved image quality.

Although the iron oxide particles are magnetic, the present device and electrophoretic process, does not utilize the magnetic property of the particles.

Any suitable marking material can be employed. Typical particles include zinc oxide, titanium dioxide, zinc sulfide and barium sulfate. The particle diameter can vary widely but is typically in the range of from about 0.05 micron to about 5 microns. Particles having a diameter in the range of about 0.2 micron are preferred because at such diameter they tend to scatter light effectively.

The colloidal suspending medium contains an electrically insulating liquid which is typically a hydrocarbon. Other types of liquids are known in the art and can also be employed. Examples of such liquids as can be utilized in the electrophoretic method of this invention are heptane, cyclohexane, xylene, mineral oil, kerosene, fluorinated hydrocarbons, and carbon tetrachloride.

The concentration of the colloidal particles of the suspending medium can vary and in some instances depends upon the hiding power of the particles. Typically, the amount of particles in the electrically insulating liquid is in the range of from about 5 to about 75 percent by weight depending upon the density of the particles and the thickness of the cell. In the case of ferrofluids, the concentration of iron oxide in the liquid is measured with respect to other properties rather than weight percent. For example, one important property of ferrofluids with respect to its use in the electrophoretic display device of this invention is its conductivity. Since increased concentration of iron oxide particles increases its conductivity as well as its magnetic properties, the amount of iron oxide can be measured in these terms. Typically, the amount of iron oxide in a liquid vehicle can be measured by the magnetic properties of the ferrofluids. Generally, ferrofluids having a magnetic strength of between about 100 Gauss to about 400 Gauss are acceptable and do not provide excess conductivity. However, the conductivity of the ferrofluid can be modified by addition of various agents, such as surfactants, thus broadening the scope of the iron oxide content which can be utilized before excess conductivity reduces the image quality.

As mentioned above, small amounts of surfactants are included together with the electrophoretic particles in the suspending medium. Non-ionic, cationic and anionic surfactants can be utilized. However, anionic surfactants are preferred and, in particular, the addition of small amounts of bis-2-ethylhexyl sodium sulfo-succinate is preferred. Other surfactants include cetyl trimethyl ammonium bromide. The amount of surfactant is most effective in the range of from about 0.1 percent to about 1 percent and is preferably in the range of about 0.3 percent depending on the concentration of the imaging particle. In some instances, the surfactant is preferably dried before use.

BRIEF DESCRIPTION OF THE DRAWING

The FIGURE is a cross-sectional view of an electrophoretic display device of this invention.

DETAILED DESCRIPTION OF THE DRAWING

Referring to the FIGURE, an electrophoretic cell generally designated 1 comprises a top 3 and bottom 5 which are coated with areas of electrical conductivity to form electrodes 7, 7', 7" and 7'". The electrodes must be transparent, at least on one side. In the device of the FIGURE, top 3 is utilized to view the image and thus electrodes 7 and 7', as well as, top 3 must be transparent. Side walls 9 and 9' complete a cavity between the electrodes thus providing a container into which is placed electrophoretic particles generally designated as 11. Also included in the cavity between the electrodes 3 and 5 is a suspending medium generally shown as fluid 13 containing colloidal sized particles. The colloidal sized particles provide a color contrast with electrophoretic particles 11, as will be more fully described below.

In operation, the device of the FIGURE is provided with an electrical potential from sources 15 and 15' thereby placing an electrical fleid across the cavity between the electrodes. Particles 11, in this particular illustration, are positively charged and electrophoretically driven to the negative electrode. The electrodes are addressable so as to create an imagewise pattern of an electrical field across the cavity thereby attracting particles 11 selectively. When viewed from top 3 through transparent electrode 7' as shown by light rays 17, the electrophoretic particles are visible, but the electrophoretic particles 11 adhering to electrode 7'" cannot be seen because of the colloidal particles distributed in suspending medium 13. As is well known in the art, the particles 11 spontaneously adopt a charge with respect to the fluid and a potential difference is set up. It is this charge which is acted on by the applied electric field to produce the electrophoretic migration.

In accordance with this invention, a very satisfactory electrophoretic display device is created by utilizing a ferrofluid diluted to the proper consistency as fluid 13 and incorporating into the fluid as particles 11 a white particle, such as titanium dioxide. In accordance with this invention, there has been found a very stable combination of particles wherein the electrophoretic particles retain their potential when distributed in the suspending medium yet provide excellent contrast with the suspending medium.

By utilizing segmented electrodes as indicated in the FIGURE, a compartmentalized electrophoretic display device can be constructed. That is, dividers between the electrodes can segment the cavity between top 3 and bottom 5. Thus, the electrophoretic display device can be made up of a plurality of cavities between the top and the bottom rather than a single cavity. In some instances, the particles 11 are more easily prevented from settling out in such a segmented cell.

DESCRIPTION OF THE PREFERRED EMBODIMENTS

The following examples further specifically illustrate the present invention. The percentages are by weight unless otherwise indicated. The examples below are intended to illustrate various preferred embodiments of the electrophoretic display device and process of this invention.

In order to illustrate the advantages of the present invention, a test cell is prepared utilizing a pair of electrodes comprising Nesatron plates, a commercial transparent electrode available from the Pittsburgh Plate Glass Company. The Nesatron plates are glass coated with a conductive, transparent layer of indium oxide. The electrodes are separated by a 50 micron thick spacer containing a cut out portion providing a cavity of approximately 2.4 cm. by 3 cm. A square wave power supply of up to 100 volts is connected to the electrodes. The ferrofluids utilized in the examples are obtained from Ferrofluidics, Inc. and have an electrical resistivity of $10^8$ ohm-cm at 60 Hz and a dielectric constant of 20 at 1 KHz. Unless otherwise noted, the ferrofluid is diluted 50 percent in heptane for use in the examples. The response time reported in the examples is taken at 90 percent of the maximum contrast for time (on) response and a 90 percent depletion for response time (off).

EXAMPLE 1

An imaging suspension is prepared by combining about 0.2 g. of titanium dioxide and 1 ml. of ferrofluid having a reading of 100 Gauss. The ferrofluid is employed as obtained commercially, without dilution. Also included in this suspension is 4 mg. of bis-2-ethyl-hexyl sodium sulfo-succinate. The amount of light reflected from white and black areas of the transparent electrode are observed, while the voltage across the cell is modified as indicated below. To provide an emperical relationship, a white color standard is provided by barium sulfate coated glass which provides a reading of 1771 units of reflected light while a black cloth provides a reflection of 51 units. The contrast of the standard is determined by subtracting the units of reflected light obtained from the black cloth from units of light obtained from the coated glass which, in this example, provides a standard contrast of 1720. Contrast is likewise determined with the cell containing the above described imaging suspension. Contrast ratio (CR) is obtained with the above described imaging suspension and is determined by dividing the contrast from the device by the contrast obtained from the standard. The results obtained are as follows:

TABLE I

| Voltage Applied | CR |
|---|---|
| 25 | .86 |
| 50 | .86 |
| 75 | .89 |

EXAMPLE II

The procedure of Example I is repeated with the exception that the surfactant is replaced by Triton X-100. The results obtained are as follows:

TABLE II

| Voltage Applied | CR |
|---|---|
| 25 | .91 |
| 50 | .90 |
| 75 | .90 |

EXAMPLES III-V

A series of imaging suspensions are prepared by combining 1 cc. of undiluted ferrofluid with about 0.2 g. of titanium dioxide having an average diameter of about 0.2 microns. To each of the separate suspending media are added 3 mg. of surfactant bis-2-ethylhexyl sodium sulfosuccinate for each ml. of ferrofluid. Each imaging suspension has an increasing concentration of iron oxide particles. In Example III the magnetic saturation of the ferrofluid is 100 Gauss; in Example IV the ferrofluid has a magnetic saturation of 200 Gauss; and in Example V, the ferrofluid has a magnetic saturation of 400 Gauss. The response time of the cell in each instance is determined and indicated in Table III below.

TABLE III

| Example No. | Response Time (on) |
|---|---|
| III | .7 sec. |
| IV | 1.1 sec. |

TABLE III-continued

| Example No. | Response Time (on) |
|---|---|
| V | .9 sec. |

EXAMPLES VI-VIII

The response time of the electrophoretic display medium of this invention is determined with various loadings of electrophoretic particles. The above described titanium dioxide is incorporated into a ferrofluid diluted to 50 percent in heptane wherein the ferrofluid has a magnetic saturation of 200 Gauss. The above described surfactant of Examples III-V is added a constant ratio of 3 mg. of surfactant to 0.2 grams of titanium dioxide. The response time on and off together with the electrical D.C. resistivity in ohm-cm. is provided below in Table II. In Example VI, there is added 0.1 gram of titanium dioxide per ml. of diluted ferrofluid; in Example VII, 0.2 grams of titanium dioxide per ml. of diluted ferrofluid; and in Example VIII, 0.3 grams of titanium dioxide is added per ml. of diluted ferrofluid.

TABLE IV

| Example No. | Response Time (on) | Response Time (off) | D. C. Resistivity |
|---|---|---|---|
| VI | .3 sec. | .2 sec. | $3.4 \times 10^9$ |
| VII | .4 sec. | .3 sec. | $2.7 \times 10^9$ |
| VIII | .6 sec. | .4 sec. | $1 \times 10^9$ |

EXAMPLES IX-XI

The effect of varying amounts of surfactant is shown by the following data utilizing the ferrofluid of Example VII but varying the amount of surfactant. In Example IX, 3 mg. of surfactant is added; in Example X, 6 mg. of surfactant is added; and in Example XI, 9 mg. of surfactant is added. The data obtained with respect to response time and conductivity is given in Table V below.

TABLE V

| Example No. | Response Time (on) | Response Time (off) | D. C. Resistivity |
|---|---|---|---|
| IX | .3 sec. | .4 sec. | $1.9 \times 10^9$ |
| X | .2 sec. | .4 sec. | $1.2 \times 10^9$ |
| XI | .25 sec. | .4 sec. | $9.1 \times 10^8$ |

EXAMPLES XII-XIV

The procedure of Examples IX-XI are repeated with the exception that the voltage is raised from 60 volts to 90 volts. The response time observed is presented below in Table VI wherein Examples XII, XIII and XIV correspond to Examples IX, X and XI, respectively, with the exception of the increased voltage.

TABLE VI

| Example No. | Response Time (off) | Response time (on) |
|---|---|---|
| XII | .1 sec. | .3 sec. |
| XIII | .1 sec. | .3 sec. |
| XIV | .1 sec. | .4 sec. |

EXAMPLE XV

An electrophoretic display imaging suspension is provided by combining 1 ml. of the diluted 200 Gauss ferrofluid with 0.2 grams titanium dioxide and 4 mg. of bis-2-ethylhexyl sodium sulfo-succinate. An alternating current of 60 volts and 0.2 Hz. is applied to the electrodes. A response time (off) is found to be 0.2 sec. while response time (on) is 0.4 sec. The D.C. resistivity was determined to be $1.9 \times 10^9$ ohm-cm. The frequency is increased to 10 Hz. and then to 60 Hz. An optical response is still observable with no cell damage.

EXAMPLE XVI

An electrophoretic display imaging suspension is prepared by combining, for each ml. of diluted 200 Gauss ferrofluid, 10 microliters. Triton X-100, an alkylaryl polyether alcohol available from Rohm & Haas Corp., Philadelphia, Pennsylvania and 0.2 grams of titanium dioxide. At 30 volts across the cell and 0.3 Hz., the response time was determined to be 0.3 sec. (on) and 0.25 sec. (off) with a D.C. resistivity of $2.2 \times 10^8$. At 45 volts across the cell, the response time is determined to be 0.15 sec. (off) and 0.20 sec. (on). Although the conductivity of the cell increased with the use of Triton X-100, the whiteness of the marking particle appears greater than with the surfactant of the previous examples. The Triton is X-100 observed to be imiscible with ferrofluids and consequently absorbs strongly on the titanium dioxide particle surface. However, a small amount of permanent plating of the marking particles is observed.

Other modifications and ramifications of the present invention will occur to those skilled in the art upon a reading of the present disclosure. These are intended to be included within the scope of this invention.

What is claimed is:

1. An electrophoretic imaging process which comprises applying a voltage to a pair of electrodes spaced apart to form a cavity therebetween, at least one of said electrodes being transparent to visible light, said cavity containing an electrophoretic imaging suspension comprising (1) electrophoretic imaging particles suspended in (2) a suspending medium comprising a suspension of colloidal iron oxide particles in an electrically insulating liquid, whereby the voltage causes the electrophoretic movement of said electrophoretic particles in imagewise configuration and to visibly appear at said transparent electrode.

2. The process of claim 1 wherein the colloidal particles in said suspending medium have a diameter in the range of from about 50 Angstroms to about 250 Angstroms.

3. The process of claim 1 wherein the electrophoretic particles are white in color and the colloidal particles are black in color.

4. The process of claim 1 wherein the iron oxide particles have a magnetic saturation in the range of from about 100 Gauss to about 400 Gauss.

5. The process of claim 1 wherein the imaging suspension contains a surfactant.

6. The process of claim 5 wherein the surfactant is anionic.

7. The process of claim 6 wherein the anionic surfactant comprises bis-2-ethylhexyl sodium sulfo-succinate.

8. The process of claim 5 wherein the surfactant is Triton X-100.

9. An electrophoretic imaging process which comprises applying a voltage to a pair of electrodes spaced apart to form a cavity therebetween, at least one of said electrodes being transparent to visible light, said cavity containing an electrophoretic imaging suspension comprising electrophoretic zinc oxide particles suspended in a suspended medium comprising colloidal sized particles of iron oxide suspended in an electrically insulating liquid, said imaging suspension also containing an anionic surfactant whereby the voltage causes electrophoretic movement of said electrophoretic particles in imagewise configuration and to visible appear at said transparent electrode.

* * * * *